(12) United States Patent  
Yang

(10) Patent No.: US 11,380,219 B2  
(45) Date of Patent: Jul. 5, 2022

(54) DISPLAY DEVICE

(71) Applicant: Samsung Display Co., Ltd., Yongin-si (KR)

(72) Inventor: Jeong Do Yang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 669 days.

(21) Appl. No.: 16/355,030

(22) Filed: Mar. 15, 2019

(65) Prior Publication Data

US 2020/0043383 A1 Feb. 6, 2020

(30) Foreign Application Priority Data

Aug. 3, 2018 (KR) ........................ 10-2018-0090846

(51) Int. Cl.
| | |
|---|---|
| *B32B 17/06* | (2006.01) |
| *G09F 9/30* | (2006.01) |
| *B32B 15/04* | (2006.01) |
| *B32B 15/20* | (2006.01) |
| *B32B 7/12* | (2006.01) |
| *G09F 9/37* | (2006.01) |
| *G09F 9/302* | (2006.01) |

(52) U.S. Cl.
CPC ............... *G09F 9/301* (2013.01); *B32B 7/12* (2013.01); *B32B 15/04* (2013.01); *B32B 15/20* (2013.01); *G09F 9/302* (2013.01); *G09F 9/37* (2013.01); *B32B 2457/20* (2013.01)

(58) Field of Classification Search
CPC . G09F 9/37; G09F 9/301; G09F 9/302; B32B 3/08; B32B 3/30; B32B 7/12; B32B 15/04; B32B 15/043; B32B 15/18; B32B 15/20; B32B 2307/732; B32B 2457/20; B32B 2457/202; B32B 2457/204; B32B 2457/206
See application file for complete search history.

(56) References Cited

U.S. PATENT DOCUMENTS

| | | | |
|---|---|---|---|
| 8,174,628 B2* | 5/2012 | Matsushita | G06F 3/1423 |
| | | | 348/836 |
| 9,419,065 B2* | 8/2016 | Degner | H05K 1/028 |
| 2013/0058063 A1* | 3/2013 | O'Brien | G06F 1/1652 |
| | | | 361/807 |
| 2016/0227645 A1* | 8/2016 | Hampton | G06F 1/1616 |
| 2017/0038798 A1* | 2/2017 | Lee | G06F 1/1616 |
| 2017/0064847 A1* | 3/2017 | Lim | G09F 9/00 |

(Continued)

FOREIGN PATENT DOCUMENTS

| | | |
|---|---|---|
| KR | 10-2005-0004857 A | 1/2005 |
| KR | 10-2014-0077807 A | 6/2014 |

(Continued)

*Primary Examiner* — Joe H Cheng  
(74) *Attorney, Agent, or Firm* — Lewis Roca Rothgerber Christie LLP

(57) ABSTRACT

A display device includes a display panel including a first region and a second region adjacent to the first region and being extendable, a supporting plate configured to support the first region of the display panel and being inflexible, and an extending portion supporter configured to support the second region of the display panel and being deformable, wherein the extending portion supporter includes a first metal thin film layer and a second metal thin film layer overlapping each other.

20 Claims, 11 Drawing Sheets

(56) References Cited

U.S. PATENT DOCUMENTS

| | | | | |
|---|---|---|---|---|
| 2018/0102072 A1* | 4/2018 | Lee | ................ | G09F 9/301 |
| 2018/0166652 A1* | 6/2018 | Kim | ................ | B32B 27/308 |
| 2018/0175310 A1* | 6/2018 | Lee | ................ | B32B 27/286 |
| 2019/0213924 A1* | 7/2019 | Ha  | ................ | G09F 9/301 |

FOREIGN PATENT DOCUMENTS

| | | |
|---|---|---|
| KR | 10-2016-0047869 A | 5/2016 |
| KR | 10-2016-0141255 A | 12/2016 |
| KR | 10-2018-0018686 A | 2/2018 |
| WO | WO 2017/056523 A1 | 4/2017 |

\* cited by examiner

DISPLAY DEVICE

CROSS-REFERENCE TO RELATED APPLICATION

This application claims priority to and the benefit of Korean Patent Application No. 10-2018-0090846, filed in the Korean Intellectual Property Office on Aug. 3, 2018, the entire content of which is incorporated herein by reference.

BACKGROUND

1. Field

Aspects of the disclosure relate to a display device.

2. Description of the Related Art

The display device includes a liquid crystal display (LCD), a plasma display panel (PDP), and an organic light emitting diode (OLED) device.
In recent years, foldable display devices that can be folded or unfolded or rollable display devices that can be rolled have been developed. Such foldable or rollable display devices may include a display device that is extendable. When the display unit is extended, it is important to support the extended display unit used by a user in an operation such as a user touch. In addition, portability is an important factor for the extendable display device. The portability may be lowered when the volume of the extendable display device is increased due to a supporting unit supporting the display unit.

The above information disclosed in this Background section is only for enhancement of understanding of the background of the invention and therefore it may contain information that does not form the prior art that is already known in this country to a person of ordinary skill in the art.

SUMMARY

Aspects of embodiments are directed toward an extendable display device capable of being easily bent and supporting an extended display unit thereof without increasing or substantially increasing the volume of a supporting unit supporting the display unit thereof.

According to some exemplary embodiments, there is provided a display device including: a display panel including a first region and a second region adjacent to the first region and being extendable; a supporting plate configured to support the first region of the display panel and being inflexible; and an extending portion supporter configured to support the second region of the display panel and being deformable, wherein the extending portion supporter includes a first metal thin film layer and a second metal thin film layer overlapping each other.

In some embodiments, the display device further includes an extension driver that partially contacts the extending portion supporter, wherein the extending portion supporter and the display panel include a bent portion bent along the extension driver.

In some embodiments, a thickness of the supporting plate is greater than that of the extending portion supporter.

In some embodiments, the display device further includes an adhesive layer between the first metal thin film layer and the second metal thin film layer.

In some embodiments, a thickness of each of the first metal thin film layer and the second metal thin film layer is greater than that of the adhesive layer.

In some embodiments, one of the first metal thin film layer and the second metal thin film layer includes a first end portion adjacent to the supporting plate and a second end portion opposite from the first end portion, and the first end portion is connected to the supporting plate.

In some embodiments, the first end portion is disposed between the display panel and the supporting plate.

In some embodiments, the supporting plate includes a plurality of protrusions, the first end portion has a plurality of grooves, and the protrusions and the grooves are configured to couple to one another.

In some embodiments, the display device further includes an elasticity-applying unit connected to the second end portion.

In some embodiments, the elasticity-applying unit is connected to at least one of the first metal thin film layer and the second metal thin film layer, and the second end portion connected to the elasticity-applying unit does not overlap the display panel.

In some embodiments, the one of the first metal thin film layer and the second metal thin film layer includes a first end portion adjacent to the supporting plate and a second end portion opposite from the first end portion, and the first end portion is connected to the supporting plate.

In some embodiments, the first end portion is between the display panel and the supporting plate.

In some embodiments, the display device further includes an elasticity-applying unit connected to the second end portion.

In some embodiments, the elasticity-applying unit is connected to at least one of the first metal thin film layer and the second metal thin film layer, and the elasticity-applying unit overlaps the display panel.

According to some exemplary embodiments, there is provided a display device including: a display panel including a first region and a second region adjacent to the first region and being extendable; a supporting plate configured to support the first region of the display panel and being inflexible; and an extending portion supporter configured to support the second region of the display panel and being deformable, wherein the extending portion supporter includes a first metal thin film layer and a second metal thin film layer overlapping each other, and wherein portions of the first metal thin film layer and the second metal thin film layer are between the display panel and the supporting plate.

In some embodiments, the display device further includes an adhesive layer between the first metal thin film layer and the second metal thin film layer.

In some embodiments, the display device further includes an elasticity-applying unit connected to an end portion of at least one of the first metal thin film layer and the second metal thin film layer.

In some embodiments, the end portion of the at least one of the first metal thin film layer and the second metal thin film layer connected to the elasticity-applying unit does not overlap with the display panel.

In some embodiments, the display device further includes an elasticity-applying unit connected to an end portion of at least one of the first metal thin film layer and the second metal thin film layer.

In some embodiments, the end portion of at least one of the first metal thin film layer and the second metal thin film layer connected to the elasticity-applying unit does not overlap with the display panel.

According to the exemplary embodiments, it is possible to provide an extendable display device capable of being easily bent and supporting an extended display unit thereof without increasing or substantially increasing the volume of a supporting unit supporting the display unit thereof.

DETAILED DESCRIPTION

Figure 1:
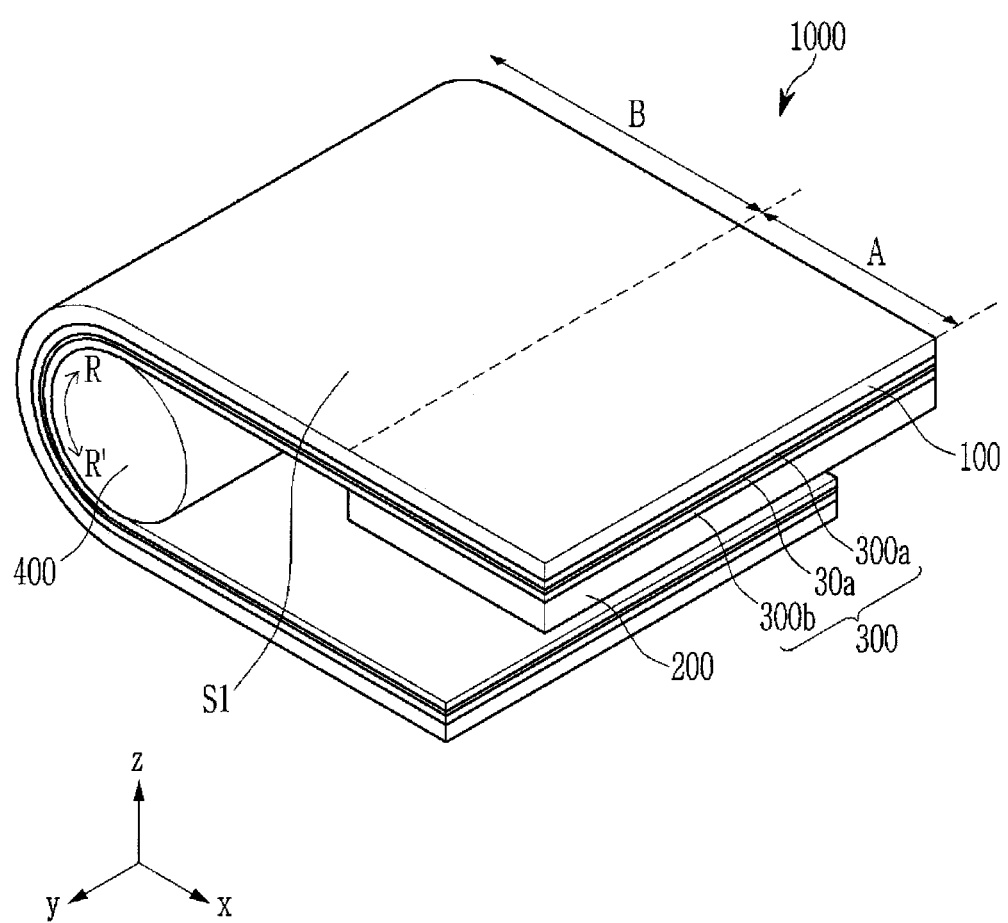
FIG. 1 illustrates a schematic perspective view of a display device according to an exemplary embodiment.

The present invention will be described more fully hereinafter with reference to the accompanying drawings, in which exemplary embodiments of the invention are shown. As those skilled in the art would realize, the described embodiments may be modified in various suitable ways, all without departing from the spirit or scope.

To clearly describe the present invention, parts that are irrelevant to the description may be omitted, and like numerals refer to like or similar constituent elements throughout the specification.

Further, since sizes and thicknesses of constituent members shown in the accompanying drawings are arbitrarily given for better understanding and ease of description, the present invention is not limited to the illustrated sizes and thicknesses. In the drawings, the thicknesses of layers, films, panels, regions, etc., may be exaggerated for clarity.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

It will be understood that, although the terms "first", "second", "third", etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

It will also be understood that when a layer is referred to as being "between" two layers, it can be the only layer between the two layers, or one or more intervening layers may also be present.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ.

Further, the use of "may" when describing embodiments of the inventive concept refers to "one or more embodiments of the inventive concept." Also, the term "exemplary" is intended to refer to an example or illustration.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", or "immediately adjacent" another element or layer, there are no intervening elements or layers present.

As used herein, the term "substantially," "about," and similar terms are used as terms of approximation and not as terms of degree, and are intended to account for the inherent variations in measured or calculated values that would be recognized by those of ordinary skill in the art.

As used herein, the terms "use," "using," and "used" may be considered synonymous with the terms "utilize," "utilizing," and "utilized," respectively.

Further, a specific quantity or range recited in this written description or the claims may also encompass the inherent variations in measured or calculated values that would be recognized by those of ordinary skill in the art. Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification.

Further, in the specification, the phrase "in a plan view" means when an object portion is viewed from above, and the phrase "in a cross-section" means when a cross-section taken by vertically cutting an object portion is viewed from the side.

Figure 2:
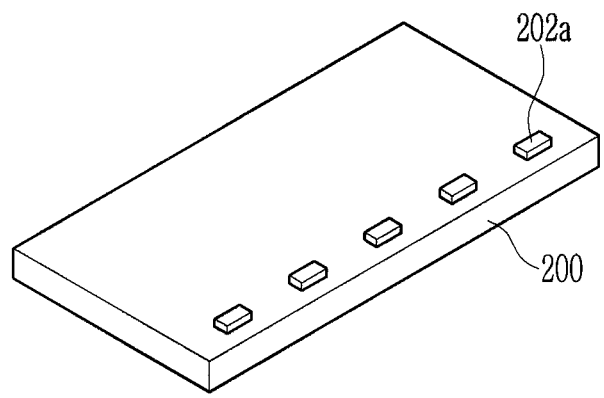
FIG. 2 and FIG. 3 illustrate perspective views of a portion of the display device illustrated in FIG. 1.
Figure 3:
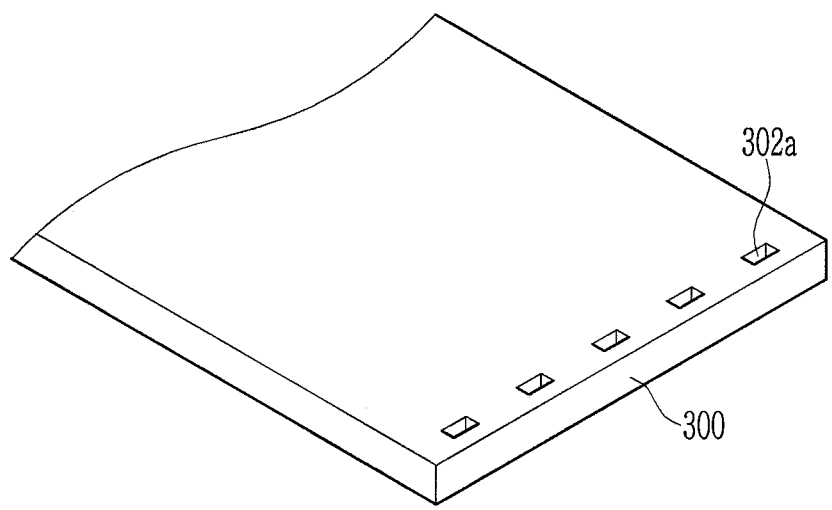
Figure 4:
FIG. 4 illustrates a cross-sectional view of a portion of the display device illustrated in FIG. 1.

A display device according to an exemplary embodiment will now be described with reference to FIG. 1 to FIG. 4. FIG. 1 illustrates a schematic perspective view of a display device according to an exemplary embodiment, FIG. 2 and FIG. 3 illustrate perspective views of a portion of the display device illustrated in FIG. 1, and FIG. 4 illustrates a cross-sectional view of a portion of the display device illustrated in FIG. 1.

First, referring to FIG. 1, the display device 1000 according to the present exemplary embodiment includes a display panel 100, a supporting plate 200, an extending portion supporter 300, and an extension driver 400.

The display panel 100 may be divided into a display area for displaying an image and a peripheral area. The display area, which serves to display an image, may include a plurality of pixels disposed therein. The peripheral region, which is a region other than the display region in which the plurality of pixels are arranged in the display panel 100, may include a driving signal line, a driving portion, and the like that are utilized for driving the display area arranged therein.

The display panel 100 may include a first region A that is supported by the supporting plate 200, and a second region B that is supported by the extending portion supporter 300 instead of being supported by the supporting plate 200 (i.e., the second region B is not directly supported by the supporting plate 200). The first region A and the second region B may be adjacent to each other in a first direction x. The first region A and the second region B have a first surface S1 facing a third direction z, and the first surface S1 may be flat. A portion of the display panel 100 having the first surface S1 facing the third direction z is referred to as the display unit, and the area of this portion is referred to as the display area.

The supporting plate 200 has a substantially flat surface, and a shape of the supporting plate 200 may be fixed and not vary (e.g., the supporting plate may be rigid/inflexible). A thickness of the extending portion supporter 300 may be less than that of the supporting plate 200.

At least a portion of the supporting plate 200 may overlap the extending portion supporter 300. According to the illustrated exemplary embodiment, an entirety of the supporting plate 200 overlaps the extending portion supporter 300; however, embodiments are not limited thereto.

A portion of the extending portion supporter 300 may be disposed between the display panel 100 and the supporting plate 200.

The extending portion supporter 300 includes a first metal thin film layer 300a and a second metal thin film layer 300b that overlap each other, and an adhesive layer 30a disposed between the first metal thin film layer 300a and the second metal thin film layer 300b. According to the illustrated exemplary embodiment, the extending portion supporter 300 includes, but is not limited to, two metal thin film layers of the first metal thin film layer 300a and the second metal thin film layer 300b and one adhesive layer 30a, and may include a plurality of metal thin film layers and an adhesive layer disposed between adjacent metal thin layers. For example, a metal thin film layer of about five layers or less may be stacked, and an adhesive layer may be disposed between adjacent two metal thin film layers.

Thicknesses of the first metal thin film layer 300a and the second metal thin film layer 300b are greater than a thickness of the adhesive layer 30a. The adhesive layer 30a may have greater elasticity than the first metal thin film layer 300a and the second metal thin film layer 300b, and the adhesive layer 30a may be more easily deformed and restored by an external force than the first metal thin film layer 300a and the second metal thin film layer 300b.

A portion of the second region B of the display panel 100 contacts the extension driver 400, and a portion adjacent to the extension driver 400 has a shape that is bent according to a shape of the extension driver 400. The extending portion supporter 300 supporting the second region B of the display panel 100 also has a shape that is bent according to the shape of the extension driver 400.

The display panel 100 and the extending portion supporter 300 are moved in a sliding manner by an operation of the extension driver 400 so that an area of the second region B having a flat surface that is not bent and directed in the third direction z may change such as being widened (increased) or narrowed (reduced) along the first direction x.

The display area of the display panel 100 facing the third direction z and having a flat surface thereof may be enlarged or reduced depending on an area change of the second region B.

The extension driver 400 may include a roller, and the extension driver 400 may rotate in a first rotation direction R and a second rotation direction R', which is an opposite direction of the first rotation direction R. The area of the second region B included in the display unit of the display panel 100 decreases when the extension driver 400 rotates in the first rotation direction R, while the area of the second area included in the display unit of display panel 100 increases when the extension driver 400 rotates in the second rotation direction R'.

As a result, the display area of the display unit of the display panel 100 having the first surface S1 facing the third direction z and being flat is reduced or increased.

Coupling between the supporting plate 200 and the extending portion supporter 300 will be described in more detail with reference to FIG. 2 and FIG. 3. A plurality of protrusions 202a are formed on a surface of the supporting plate 200, and a plurality of cutouts 302a are formed in the extending portion supporter 300, which are positioned and dimensioned to accommodate (e.g., mate with) the plurality of protrusions 202a. The protrusions 202a of the supporting plate 200 and the cutouts 302a of the extending portion supporter 300 are coupled to each other (e.g., mate with each other) so that the supporting plate 200 and the extending portion supporter 300 can be coupled to (e.g., attached to) each other. However, the coupling of the supporting plate 200 and the extending portion supporter 300 is not limited thereto, and various other methods in which at least part of the supporting plate 200 and the extending portion supporter 300 are coupled and attached to each other may be used. For example, the extending portion supporter 300 may be stamped on the supporting plate 200 including the protrusions 202a, or the extending portion supporter 300 may be attached on the supporting plate 200 by using an adhesive having an adhesive force between the supporting plate 200 and the extending portion supporter 300.

As described above, the thicknesses of the first metal thin film layer 300a and the second metal thin film layer 300b of the extending portion supporter 300 are greater than a thickness of the adhesive layer 30a.

A first thickness of the first metal thin film layer 300a and the second metal thin film layer 300b may be about 100 μm or less, and in some examples, about 50 µm or less. A second thickness D2 of the adhesive layer 30a may be less than the first thickness D1. A number of metal thin film layers included in the extending portion supporter 300 according to the first thickness of the first metal thin film layer 300a and the second metal thin film layer 300b. A thickness of the extending portion supporter 300 may be less than about 500 µm. In addition, the number of the metal thin film layers included in the extending portion supporter 300 may be less than five.

The first metal thin film layer 300a and the second metal thin film layer 300b may be nickel alloys such as invar, copper alloys including copper (Cu), and stainless steel (SUS) alloys, but the present invention is not limited thereto. The adhesive layer 30a may be, but is not limited to, an adhesive polymer compound.

The first region A of the display panel 100 of the display device 1000 according to the present exemplary embodiment is supported by the supporting plate 200 that has a flat surface and does not change its shape, and the second region B with an area of the display panel 100 that is changed is supported by the extending portion supporter 300. A portion of the display panel 100 adjacent to the extension driver 400 in a part of the display panel 100 overlapping the extending portion supporter 300 may be moved in a sliding manner along the extension driver 400 in a curved shape. The extending portion supporter 300 may also be moved in the sliding manner along the extension driver 400 together with the display panel 100 in a curved shape.

As described above, the extending portion supporter 300 includes a plurality of metal thin film layers 300a and 300b having a thin thickness and overlapping each other, and an adhesive layer 30a disposed between adjacent thin metal thin film layers. When the extending portion supporter is formed of a metal layer including a relatively thick single layer, the stiffness of the metal layer constituting the extending portion supporter is greater as compared with a case of being formed of a metal thin film layer having a thin thickness. Thus it is difficult to bend the extending portion supporter at a portion adjacent to the extension driver, and it is difficult to restore an original shape thereof after the shape is deformed when an external force is applied. In addition, when the extending portion supporter is formed of a metal thin film layer including a relatively thin single layer, the extending portion supporter is easy to bend at a portion adjacent to the extension driver, and it is easy to restore an original shape thereof after the shape is deformed when an external force is applied, but it is difficult to adequately (e.g., strongly) support the display panel 100. Accordingly, when an external force such as a touch is applied to the first surface S1 of the display unit, the shape of the display panel 100 is easily changed according to the external force, so that external input may not be accurately performed. However, in the display device according to the present exemplary embodiment, the extending portion supporter 300 includes the metal thin film layers 300a and 300b having the thin thickness and overlapping each other, and thus it is easy to bend each of the metal thin film layers 300a and 300b at a portion adjacent to the extension driver 400, and it is easy to restore an original shape thereof while passing through the extension driver 400 after the bending. In addition, since the extending portion supporter 300 has sufficient strength to support the display panel 100 by the overlapping of the metal thin film layers 300a and 300b, the display panel 100 may be adequately (e.g., strongly) supported.

Hereinafter, the extending portion supporter will be described in more detail with reference to FIG. 5 to FIG. 7.

Figure 5:
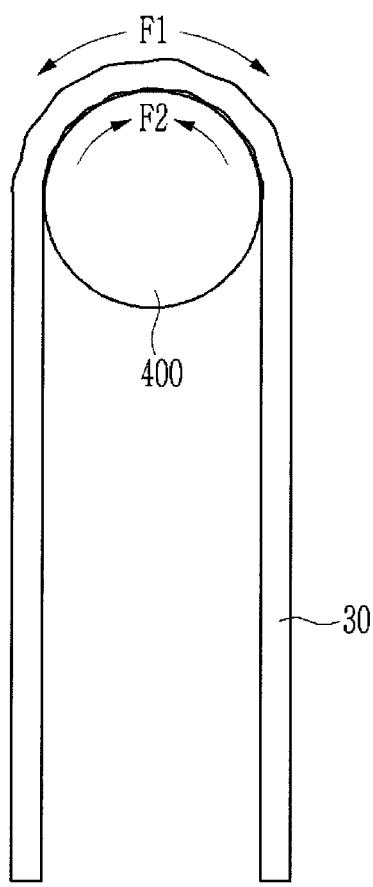
FIG. 5 is a cross-sectional view conceptually illustrating a portion of a display device according to a comparative example.
Figure 6:
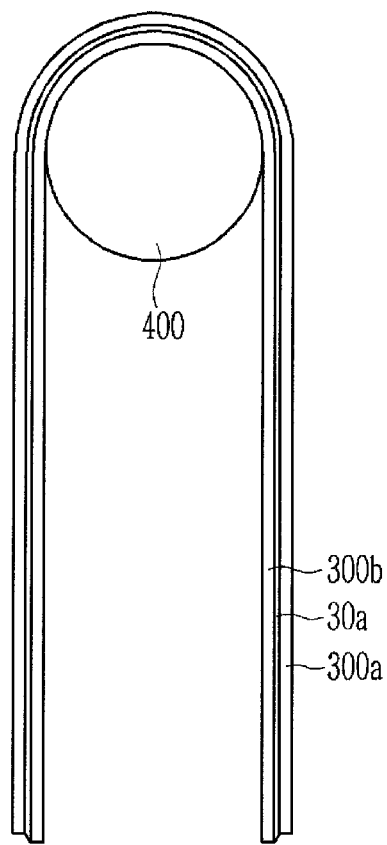
FIG. 6 is a cross-sectional view conceptually illustrating a portion of a display device according to an exemplary embodiment.
Figure 7:
FIG. 7 illustrates a process by which a supporting unit of the display device according to the exemplary embodiment of FIG. 6 is changed.

FIG. 5 is a cross-sectional view conceptually illustrating a portion of a display device according to a comparative example, FIG. 6 is a cross-sectional view conceptually illustrating a portion of a display device according to an exemplary embodiment, and FIG. 7 illustrates a process by which a supporting unit of the display device according to the exemplary embodiment of FIG. 6 is changed.

First, referring to FIG. 5, an extending portion supporter 30 is made of a metal layer as a relatively thick single layer. In the case of being made of a thick metal layer, the strength of the metal layer is relatively high, so it is difficult for the extending portion supporter 30 to easily bend along the extension driver 400 in a vicinity of the extension driver 400 such as a roller. Further, a first force F1, which is a tensile force, may be applied to a portion of the surface of the extending portion supporter 30 that is relatively far from the extension driver 400, and a second force F2, which is a compressive force, may be applied to a portion of the surface of the extending portion supporter 30 that is relatively close to the extension driver 400. The first force F1 and the second force F2 are applied to the metal layer formed of a single layer. As a result, since the first force F1 and the second force F2 are applied to the surface of the metal layer formed of a single layer in different directions, the surface of the metal layer may be uneven, so it is difficult for a portion having a surface shape that is changed to restore to the original flat shape after passing through the extension driver 400.

Referring to FIG. 6, in the display device according to the present exemplary embodiment, the extending portion supporter 300 includes the metal thin film layers 300a and 300b having the thin thickness and overlapping each other. Since each of the metal thin film layers 300a and 300b has a relatively thin thickness and limited strength, the extending portion supporter 300 is likely to be bent in the vicinity of the extension driver 400. The adhesive layer 30a disposed between the first metal thin film layer 300a and the second metal thin film layer 300b overlapping each other has elasticity that is greater than that of the first metal thin film layer 300a and the second metal thin film layer 300b, so as to be more easily deformed by an external force and restored to an original position.

The second metal thin film layer 300b, which is relatively close to the extension driver 400, and the first metal thin film layer 300a, which is relatively far from the extension driver 400, of the extending portion supporter 300 are separately deformed, to enable bending without surface shape deformation in spite of forces applied in different directions and to be restored to the original flat shape after passing through the extension driver 400.

Referring to FIG. 7, when a first force F1 is applied to the first metal thin film layer 300a of the extending portion supporter 300 in a first direction, and a second force F2 is applied to the second metal thin film layer 300b in a second direction that is different from the first direction, the first metal thin film layer 300a is deformed or moved along the first direction in which the first force F1 is applied, and the second metal thin film layer 300b is deformed or moved along the second direction in which the second force F2 is applied. In this case, since the adhesive layer 30a disposed between the first metal thin film layer 300a and the second metal thin film layer 300b may be easily deformed, a portion adjacent to the first metal thin film layer 300a may be deformed along a movement direction of the first metal thin film layer 300a, and a portion adjacent to the second metal thin film layer 300b may be deformed along a movement direction of the second metal thin film layer 300b.

As such, the display panel 100 of the display device according to the present exemplary embodiment is supported by the extending portion supporter 300 including the metal thin film layers 300a and 300b overlapping each other, to be easily bent when the display panel 100 is expanded or contracted, and to be restored to its original shape after the shape is deformed when an external force is applied. In addition, since the extending portion supporter 300 has sufficient strength to be capable of supporting the display panel 100 by the overlapping of the metal thin film layers 300a and 300b, the display panel 100 may be adequately (e.g., strongly) supported. In addition, a volume of the display device may not be increased by supporting the extendable display panel using the overlapping metal thin layers without including an additional support structure.

Figure 8:
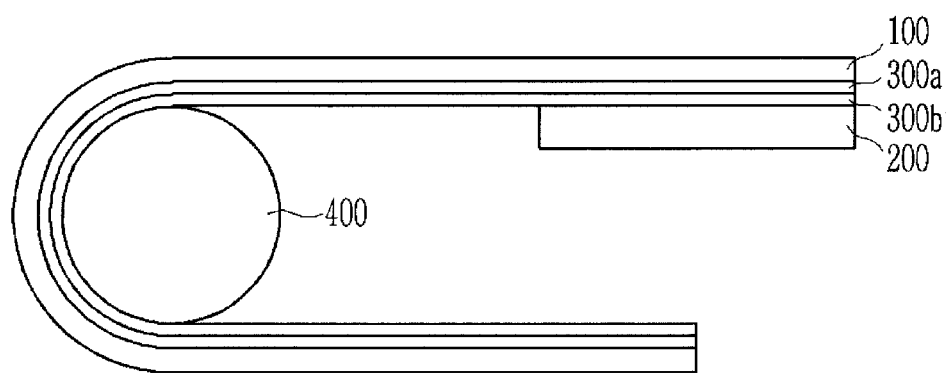
FIG. 8 illustrates a cross-sectional view of a display device according to another exemplary embodiment.
Figure 9:
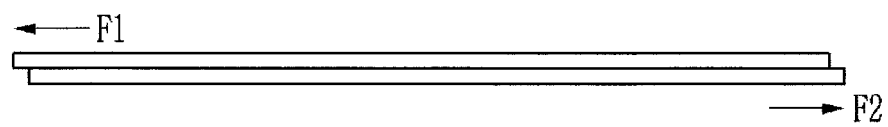
FIG. 9 illustrates a process by which a supporting unit of the display device according to the exemplary embodiment of FIG. 8 is changed.

A display device according to an exemplary embodiment will now be described with reference to FIG. 8 and FIG. 9. FIG. 8 illustrates a cross-sectional view of a display device according to another exemplary embodiment, and FIG. 9 illustrates a process by which a supporting unit of the display device according to the exemplary embodiment of FIG. 8 is changed.

Referring to FIG. 8, the display device according to the present exemplary embodiment is similar to the display device according to the embodiment described with reference to FIG. 1 to FIG. 4.

The display device 1000 according to the present exemplary embodiment includes a display panel 100, a supporting plate 200, an extending portion supporter 300, and an extension driver 400.

The supporting plate 200 has a substantially flat surface, and a shape of the supporting plate 200 may be inflexible/rigid and not vary. A thickness of the extending portion supporter 300 may be less than that of the supporting plate 200. At least a portion of the supporting plate 200 may overlap the extending portion supporter 300. A portion of the extending portion supporter 300 may be disposed between the display panel 100 and the supporting plate 200.

The extending portion supporter 300 includes a first metal thin film layer 300a and a second metal thin film layer 300b overlapping each other. According to the illustrated exemplary embodiment, the extending portion supporter 300 includes, but is not limited to, two metal thin film layers of the first metal thin film layer 300a and the second metal thin film layer 300b, and may include a plurality of metal thin film layers. For example, the extending portion supporter 300 may include a plurality of metal thin film layers stacked within 10 layers.

The extension driver 400 may include a roller and a spring.

However, unlike the display device according to the exemplary embodiment described above, the display device according to the present exemplary embodiment includes the first metal thin film layer 300a and the second metal thin film layer 300b overlapping each other, but does not include an adhesive layer 30a disposed between the first metal thin film layer 300a and the second metal thin film layer 300b.

A thickness of each of the metal thin film layers included in the extending portion supporter 300 may be about 100 μm or less, and in some examples, about 50 μm or less. Each of the metal thin film layers included in the extending portion supporter 300 may be nickel alloys such as invar, copper alloys including copper (Cu), and SUS alloys, but the present invention is not limited thereto.

A thickness of the extending portion supporter 300 according to the present exemplary embodiment may be about 500 μm or less, and in some examples, about 300 μm or less.

Each of the metal thin film layers 300a and 300b of the extending portion supporter 300 of the display device according to the present exemplary embodiment may be separately deformed depending on applied forces so that even if the forces are applied in different directions, it is easy to restore it to its original flat shape. In addition, since the extending portion supporter 300 has sufficient strength that is capable of supporting the display panel 100 by the overlapping of the metal thin film layers 300a and 300b, the display panel 100 may be adequately (e.g., strongly) supported. In addition, a volume of the display device may not be increased by supporting the extendable display panel 100 using the overlapping metal thin layers without including an additional support structure.

Referring to FIG. 9, when a first force F1 is applied to the first metal thin film layer 300a of the extending portion supporter 300 in a first direction and a second force F2 is applied to the second metal thin film layer 300b in a second direction that is different from the first direction, the first metal thin film layer 300a is deformed or moved along the first direction in which the first force F1 is applied, and the second metal thin film layer 300b is deformed or moved along the second direction in which the second force F2 is applied. In this case, since the adhesive layer is not disposed between the first metal thin film layer 300a and the second metal thin film layer 300b, they may not be adhered to each other, thereby facilitating the shape change thereof such as separate bending or spreading.

Figure 10:
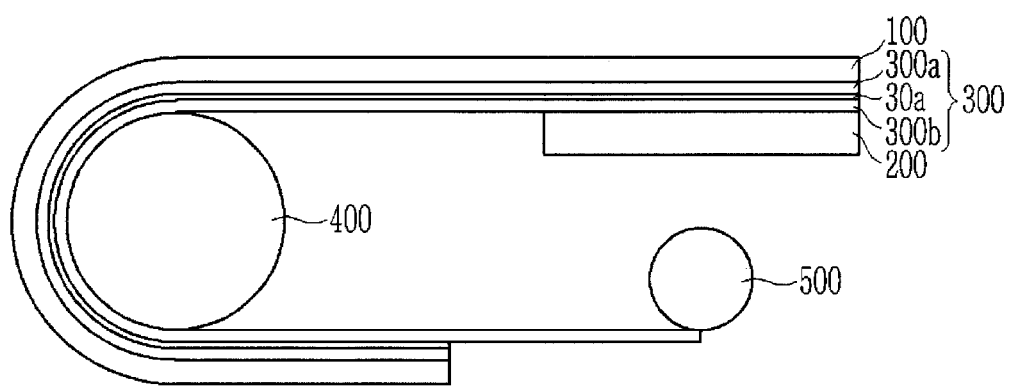
FIG. 10 illustrates a cross-sectional view of a display device according to another exemplary embodiment.

A display device according to an exemplary embodiment will now be described with reference to FIG. 10. FIG. 10 illustrates a cross-sectional view of a display device according to another exemplary embodiment.

Referring to FIG. 10, the display device according to the present exemplary embodiment is similar to the display device according to the embodiment described with reference to FIG. 1 to FIG. 4.

The display device 1000 according to the present exemplary embodiment includes a display panel 100, a supporting plate 200, an extending portion supporter 300, and an extension driver 400.

The supporting plate 200 has a substantially flat surface, and a shape of the supporting plate 200 may not vary. A thickness of the extending portion supporter 300 may be less than that of the supporting plate 200. At least a portion of the supporting plate 200 may overlap the extending portion supporter 300. A portion of the extending portion supporter 300 may be disposed between the display panel 100 and the supporting plate 200.

The extending portion supporter 300 includes a first metal thin film layer 300a and a second metal thin film layer 300b that overlap each other, and an adhesive layer 30a disposed between the first metal thin film layer 300a and the second metal thin film layer 300b. According to the illustrated exemplary embodiment, the extending portion supporter 300 includes, but is not limited to, two metal thin film layers of the first metal thin film layer 300a and the second metal thin film layer 300b, and may include a plurality of metal thin film layers. For example, metal thin film layers of about five layers or less may be stacked, and an adhesive layer may be disposed between adjacent two metal thin film layers. A thickness of each of the metal thin film layers 300a and 300b of the extending portion supporter 300 may be about 100 μm or less, and in some examples, about 50 μm or less. A number of metal thin film layers included in the extending portion supporter 300 may vary depending on a thickness of each of the metal thin film layers 300a and 300b of the extending portion supporter 300. A thickness of the extending portion supporter 300 may be less than about 500 μm. In addition, the number of the metal thin film layers included in the extending portion supporter 300 may be less than five. The first and second metal thin film layers 300a and 300b may be nickel alloys such as invar, copper alloys including copper (Cu), and SUS alloys, but the present invention is not limited thereto. As such, according to some embodiments, the extending portion supporter 300 is deformable (e.g., can be flexible and have a changing shape).

The extension driver 400 may include a roller and a spring.

However, unlike the display device according to the exemplary embodiment described with reference to FIG. 1 to FIG. 4, the display device according to the present exemplary embodiment includes an elasticity-applying unit 500 attached to an end portion of the extending portion supporter 300 supporting an extending portion of the display panel 100. The elasticity-applying unit 500 is connected to an end portion of the second metal thin film layer 300b of the extending portion supporter 300. The end portion of the second metal thin film layer 300b connected to the elasticity-applying unit 500 is extended beyond an end portion of the first metal thin film layer 300a such that the extended end portion of the first metal thin film layer 300a is connected to the elasticity-applying unit 500.

The elasticity-applying unit 500 may include a roller and a spring. The elasticity-applying unit 500 applies elasticity to the extending portion supporter 300, and pulls the extending portion supporter 300 to help maintain the surface of the extending portion supporter 300 to be flat. Accordingly, it is also possible to flatly maintain the surface of the display panel 100 supported by the extending portion supporter 300.

In the illustrated embodiment, the elasticity-applying unit 500 is connected to the end of the second metal thin film layer 300b, which is far from the display panel 100 relative to the first metal film thin layer 300a, but the present invention is not limited thereto. The elasticity-applying unit 500 is connected to at least one of the metal thin film layers 300a and 300b of the extending portion supporter 300. The end portion of the layer connected to the elasticity-applying unit 500 among the metal thin film layers 300a and 300b of the extending portion supporter 300 is extended beyond the end portion of the remaining layers to be connected with the elasticity-applying unit 500.

The elasticity-applying unit 500 is connected to at least one of the metal thin film layers 300a and 300b of the extending portion supporter 300, and is not overlapped with the display panel 100.

Each of the metal thin film layers 300a and 300b of the extending portion supporter 300 of the display device according to the present exemplary embodiment may be separately deformed depending on applied forces, so that even if the forces are applied in different directions, it is easy to restore each to its original flat shape. In addition, since the extending portion supporter 300 has sufficient strength to be capable of supporting the display panel 100 by the overlapping of the metal thin film layers 300a and 300b, the display panel 100 may be adequately (e.g., strongly) supported. In addition, a volume of the display device may not be increased by supporting the extendable display panel 100 using the overlapping metal thin layers without including an additional support structure. The elasticity-applying unit 500 is connected to the end portion of at least one of the metal thin film layers 300a and 300b of the extending portion supporter 300, so that the surface of the extending portion supporter 300 may be flatly maintained by applying elasticity to the extending portion supporter 300, and thus the surface of the display panel 100 supported by the extending portion supporter 300 may also be flatly maintained.

Figure 11:
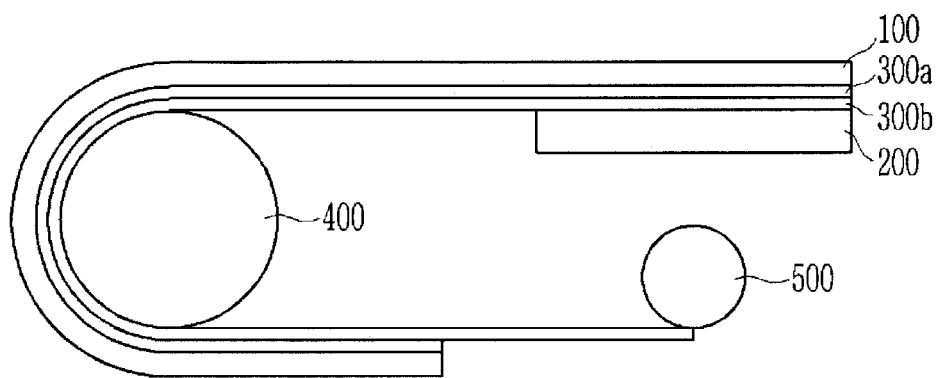
FIG. 11 illustrates a cross-sectional view of a display device according to another exemplary embodiment.

Hereinafter, a display device according to an exemplary embodiment will now be described with reference to FIG. 11. FIG. 11 illustrates a cross-sectional view of a display device according to another exemplary embodiment.

Referring to FIG. 11, the display device according to the present exemplary embodiment is similar to the display device according to the embodiment described with reference to FIG. 8.

The display device 1000 according to the present exemplary embodiment includes a display panel 100, a supporting plate 200, an extending portion supporter 300, and an extension driver 400.

The supporting plate 200 has a substantially flat surface, and a shape of the supporting plate 200 may not vary. A thickness of the extending portion supporter 300 may be less than that of the supporting plate 200. At least a portion of the supporting plate 200 may overlap the extending portion supporter 300. A portion of the extending portion supporter 300 may be disposed between the display panel 100 and the supporting plate 200.

The extending portion supporter 300 includes a first metal thin film layer 300a and a second metal thin film layer 300b that overlap each other, and the first metal thin film layer 300a and the second metal thin film layer 300b of the extending portion supporter 300 are not attached to each other. According to the illustrated exemplary embodiment, the extending portion supporter 300 includes, but is not limited to, two metal thin film layers of the first metal thin film layer 300a and the second metal thin film layer 300b, and may include a plurality of metal thin film layers. For example, the extending portion supporter 300 may include a plurality of metal thin film layers stacked within 10 layers. A thickness of each of the metal thin film layers included in the extending portion supporter 300 may be about 100 μm or less, and in some examples, about 50 μm or less. Each of the metal thin film layers included in the extending portion supporter 300 may be nickel alloys such as invar, copper alloys including copper (Cu), and SUS alloys, but the present invention is not limited thereto.

A thickness of the extending portion supporter 300 according to the present exemplary embodiment may be about 500 μm or less, and in some examples, about 300 μm or less.

The extension driver 400 may include a roller and a spring.

However, unlike the display device according to the exemplary embodiment described with reference to FIG. 8, the display device according to the present exemplary embodiment includes an elasticity-applying unit 500 attached to an end portion of the extending portion supporter 300 supporting an extending portion of the display panel 100. The elasticity-applying unit 500 is connected to an end portion of the second metal thin film layer 300b of the metal thin film layers of the extending portion supporter 300. The end portion of the second metal thin film layer 300b connected to the elasticity-applying unit 500 is extended beyond an end portion of the first metal thin film layer 300a such that the extended end portion of the first metal thin film layer 300a is connected to the elasticity-applying unit 500.

The elasticity-applying unit 500 may include a roller and a spring. The elasticity-applying unit 500 applies elasticity to the extending portion supporter 300, and pulls the extending portion supporter 300 to help maintain the surface of the extending portion supporter 300 to be flat. Accordingly, it is also possible to flatly maintain the surface of the display panel 100 supported by the extending portion supporter 300.

In the illustrated embodiment, the elasticity-applying unit 500 is connected to the end of the second metal thin film layer 300b, which is far from the display panel 100 relative to the first metal thin film layer 300a, but the present invention is not limited thereto. The elasticity-applying unit 500 may be connected to at least one of the metal thin film layers 300a and 300b of the extending portion supporter 300. The end portion of the layer connected to the elasticity-applying unit 500 among the metal thin film layers 300a and 300b of the extending portion supporter 300 is extended beyond the end portion of the remaining layer to be connected with the elasticity-applying unit 500.

The elasticity-applying unit 500 is connected to at least one of the metal thin film layers 300a and 300b of the extending portion supporter 300, and is not overlapped with the display panel 100.

Each of the metal thin film layers 300a and 300b of the extending portion supporter 300 of the display device according to the present exemplary embodiment may be separately deformed depending on applied forces, so that even if the forces are applied in different directions, it is easy to restore it to its original flat shape. In addition, since the extending portion supporter 300 has sufficient strength to be capable of supporting the display panel 100 by the overlapping of the metal thin film layers 300a and 300b, the display panel 100 may be adequately (e.g., strongly) supported. In addition, a volume of the display device may not be increased by supporting the extendable display panel using the overlapping metal thin layers without including an additional support structure. The elasticity-applying unit 500 is connected to the end portion of at least one of the metal thin film layers 300a and 300b of the extending portion supporter 300, so that the surface of the extending portion supporter 300 may be flatly maintained by applying elasticity to the extending portion supporter 300, and thus the surface of the display panel 100 supported by the extending portion supporter 300 may also be flatly maintained.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the invention, as define by the appended claims and equivalents thereof.

DESCRIPTION OF SOME OF THE SYMBOLS

1000: display device
100: display panel
200: supporting panel
300: extending portion supporter
300a, 300b: metal thin film layer
30a: adhesive layer
400: extension driver
500: elasticity-applying unit

What is claimed is:

1. A display device comprising:
a display panel comprising a first region and a second region adjacent to the first region and being extendable;
a supporting plate configured to support the first region of the display panel and being inflexible; and
an extending portion supporter configured to support the second region of the display panel and being deformable,
wherein the extending portion supporter comprises a first metal thin film layer and a second metal thin film layer overlapping each other.

2. The display device of claim 1, further comprising an extension driver that partially contacts the extending portion supporter,
wherein the extending portion supporter and the display panel comprise a bent portion bent along the extension driver.

3. The display device of claim 2, wherein a thickness of the supporting plate is greater than that of the extending portion supporter.

4. The display device of claim 2, further comprising an adhesive layer between the first metal thin film layer and the second metal thin film layer.

5. The display device of claim 4, wherein a thickness of each of the first metal thin film layer and the second metal thin film layer is greater than that of the adhesive layer.

6. The display device of claim 5, wherein one of the first metal thin film layer and the second metal thin film layer comprises a first end portion adjacent to the supporting plate and a second end portion opposite from the first end portion, and
wherein the first end portion is connected to the supporting plate.

7. The display device of claim 6, wherein the first end portion is disposed between the display panel and the supporting plate.

8. The display device of claim 7, wherein the supporting plate comprises a plurality of protrusions,
wherein the first end portion has a plurality of grooves, and
wherein the protrusions and the grooves are configured to couple to one another.

9. The display device of claim 7, further comprising an elasticity-applying unit connected to the second end portion.

10. The display device of claim 9, wherein the elasticity-applying unit is connected to at least one of the first metal thin film layer and the second metal thin film layer, and
wherein the second end portion connected to the elasticity-applying unit does not overlap the display panel.

11. The display device of claim 2, wherein the one of the first metal thin film layer and the second metal thin film layer comprises a first end portion adjacent to the supporting plate and a second end portion opposite from the first end portion, and
wherein the first end portion is connected to the supporting plate.

12. The display device of claim 11, wherein the first end portion is between the display panel and the supporting plate.

13. The display device of claim 11, further comprising an elasticity-applying unit connected to the second end portion.

14. The display device of claim 13, wherein the elasticity-applying unit is connected to at least one of the first metal thin film layer and the second metal thin film layer, and
wherein the elasticity-applying unit overlaps the display panel.

15. A display device comprising:
a display panel comprising a first region and a second region adjacent to the first region and being extendable;
a supporting plate configured to support the first region of the display panel and being inflexible; and an extending portion supporter configured to support the second region of the display panel and being deformable, wherein the extending portion supporter comprises a first metal thin film layer and a second metal thin film layer overlapping each other, and wherein portions of the first metal thin film layer and the second metal thin film layer are between the display panel and the supporting plate.

16. The display device of claim 15, further comprising an adhesive layer between the first metal thin film layer and the second metal thin film layer.

17. The display device of claim 16, further comprising an elasticity-applying unit connected to an end portion of at least one of the first metal thin film layer and the second metal thin film layer.

18. The display device of claim 17, wherein the end portion of the at least one of the first metal thin film layer and the second metal thin film layer connected to the elasticity-applying unit does not overlap with the display panel.

19. The display device of claim 15, further comprising an elasticity-applying unit connected to an end portion of at least one of the first metal thin film layer and the second metal thin film layer.

20. The display device of claim 19, wherein the end portion of at least one of the first metal thin film layer and the second metal thin film layer connected to the elasticity-applying unit does not overlap with the display panel.

* * * * *